US008179547B2

(12) United States Patent
Kamasuka et al.

(10) Patent No.: US 8,179,547 B2
(45) Date of Patent: May 15, 2012

(54) CODE INFORMATION PRINTING APPARATUS, PRINTING METHOD, RESTORATION APPARATUS, AND RESTORATION METHOD

(75) Inventors: Atsushi Kamasuka, Chiba-ken (JP); Fumio Shoji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1080 days.

(21) Appl. No.: 11/669,508

(22) Filed: Jan. 31, 2007

(65) Prior Publication Data

US 2007/0177204 A1 Aug. 2, 2007

(30) Foreign Application Priority Data

Feb. 2, 2006 (JP) .................................. 2006-026180

(51) Int. Cl.
*G06F 3/12* (2006.01)
(52) U.S. Cl. .......... 358/1.15; 358/1.1; 358/1.6; 382/100; 713/179
(58) Field of Classification Search .................. 358/1.15, 358/1.6; 382/100; 713/179
See application file for complete search history.

(56) References Cited

U.S. PATENT DOCUMENTS

| 5,541,993 | A | * | 7/1996 | Fan et al. ....................... 380/243 |
| 6,085,251 | A | * | 7/2000 | Fabozzi, II ..................... 709/230 |
| 6,634,559 | B2 | * | 10/2003 | Shioda et al. .................. 235/487 |
| 6,680,782 | B1 | * | 1/2004 | Jamzadeh ....................... 358/1.14 |
| 6,751,780 | B1 | * | 6/2004 | Neff et al. ...................... 715/247 |
| 2002/0135816 | A1 | | 9/2002 | Ohwa |
| 2005/0105148 | A1 | | 5/2005 | Misawa |
| 2005/0219616 | A1 | | 10/2005 | Furuta et al. |
| 2007/0143277 | A1 | * | 6/2007 | Van De Laar et al. ............ 707/5 |

FOREIGN PATENT DOCUMENTS

| JP | 2001-344588 | | 12/2001 |
| JP | 2002-366883 | A | 12/2002 |
| JP | 2005-025591 | A | 1/2005 |

OTHER PUBLICATIONS

Martin Fowler, "Analysis Patterns", Addison Wesley Longman, Inc., 1997, 4 selected pages.*
The above references were cited in a Jul. 21, 2009 US Office Action that issued in related U.S. Appl. No. 11/669,529.
The above foreign patent documents were cited in a Dec. 17, 2010 Japanese Office Action, without an English Translation, that issued in Japanese Patent Application No. 2006-026180.
The above reference was cited in a Jan. 12, 2010 US Office Action that issued in related U.S. Appl. No. 11/669,529.

* cited by examiner

*Primary Examiner* — Benny Q Tieu
*Assistant Examiner* — Paul F Payer
(74) *Attorney, Agent, or Firm* — Cowan, Liebowitz & Latman, P.C.

(57) ABSTRACT

This invention facilitates an operation required to restore a desired file from code information. To accomplish this, a printing apparatus prints code information generated by encoding a file on a first sheet set, and prints identification information required to identify the sheet on which the code information corresponding to the file is printed. A restoration apparatus scans the first and second sheet sets. The restoration apparatus specifies, based on the identification information on the second sheet set, a sheet on which code information corresponding to a desired file is printed. Furthermore, the restoration apparatus restores the desired file by decoding the code information printed on the specified sheet.

6 Claims, 14 Drawing Sheets

CODE INFORMATION PRINTING APPARATUS, PRINTING METHOD, RESTORATION APPARATUS, AND RESTORATION METHOD

BACKGROUND OF THE INVENTION

1. Field of the Invention

The present invention relates to a code information printing technique and a technique for restoring a file from code information.

2. Description of the Related Art

One conventional encoding technique is QR encoding, which generates a two-dimensional (2D) code based on original data (Japanese Patent Laid-Open No. 2001-344588). Upon encoding a plurality of data using this technique, 2D codes as many as the number of data are output. In some cases, a 2D code may be divisionally output on a plurality of print sheets. Also, upon encoding large amounts of data, a 2D code may be divisionally output on a plurality of print sheets. Since, the image size of the 2D code often exceeds the size of one print sheet.

Meanwhile, from the viewpoint of security, not only data but also a file name and the like of that data are often converted into 2D codes. However, if the file name and the like required in order to identify the data are converted into 2D codes, the correspondence between the 2D code and desired data becomes hard to determine.

Even if the 2D code corresponding to the desired data can be specified, the desired data cannot be restored unless a large number of documents on which the 2D codes are printed are re-arranged in original document order. For this reason, restoration requires much troublesome processing.

SUMMARY OF THE INVENTION

It is an object of the present invention to solve at least one of such problem(s) and/or other problems. Other problems will be made clear within the entirety of the specification.

For example, a printing apparatus according to the present invention includes an inputting unit which inputs files, and a code information generating unit which generates a plurality of pieces of code information by encoding the files. Especially, the printing apparatus includes a printing unit which prints the plurality of pieces of code information of the files on a first sheet set, and prints, on a second sheet set, the identification information required to identify the sheet on which the code information corresponding to each file is printed.

A restoration apparatus includes a reading unit which reads a first sheet set on which the plurality of pieces of code information of the files are printed, and a second sheet set on which is printed the identification information required to identify the sheet containing the code information corresponding to each file. The restoration apparatus includes a designating unit which designates a file to be restored. Furthermore, the restoration apparatus includes a specifying unit which specifies a sheet on which the code information corresponding to the designated file is printed, based on the identification information, and a restoring unit which restores the designated file by decoding the code information printed on the specified sheet.

Further features of the present invention will become apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless specifically stated otherwise.

[Print Processing]

Figure 1:
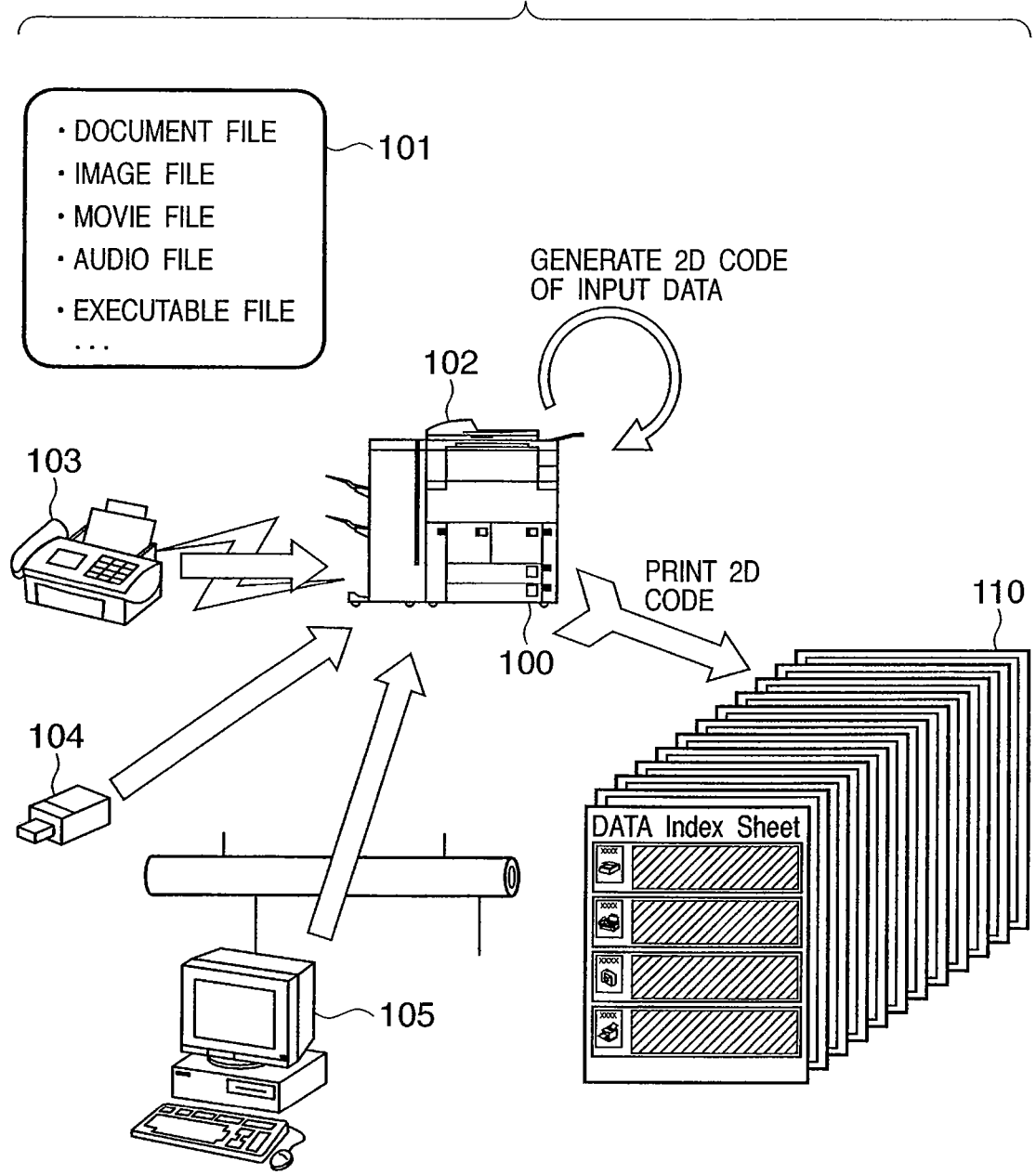
FIG. 1 is a view for explaining the concept of print processing of a two-dimensional (2D) code according to one embodiment of the present invention.

FIG. 1 is a view for explaining a concept of two-dimensional (2D) code print processing according to one embodiment of the present invention. A multi-function peripheral (MFP) 100 executes print processing of 2D codes, and will also be referred to as a data input/output apparatus, printing apparatus, image forming apparatus, or encoding apparatus. Note that a PC (personal computer), scanner, printer, and the like are combined to form a printing apparatus used to execute print processing of 2D codes in place of the MFP 100.

Input data 101 input as processing targets include, for example, document files such as a text or binary document file, and the like, image files such as a bitmap or JPEG file, and the like, and so forth, which are created by various application programs. Also, input data 101 may include movie files such as an MPEG file and the like, audio files such as an MP3 file and the like, executable files such as an EXE file and the like, and so forth. These files are input from a scanner 102, a FAX apparatus 103 via a telephone line, an external storage medium 104, or a network device 105 to the MFP 100. Note that the external storage medium 104 may include, for example, a magnetic disk, optical disk, magneto-optical disk, USB memory, memory card, and the like.

The MFP 100 encodes attribute information (e.g., file names and the like) of the input data 101, as well as the input data itself to generate 2D codes. Next, the MFP 100 prints the generated 2D codes on sheets (also called print sheets or transfer materials) 110. The sheets on which the 2D codes of the respective input data 101 are printed will be referred to as data sheets hereinafter. Because the data sheets may include one or more sheets, it will also be referred to as the first sheet set hereinafter. The attribute information of the input data 101 may include identification information required to identify the sheet on which the 2D code corresponding to each file is printed. Sheets on which the 2D code of this identification information is printed will be referred to as index sheets hereinafter. Because the index sheets include one or more sheets, they will also be referred to as the second sheet set hereinafter. Of course, even one sheet can be considered as a sheet set.

Figure 2:
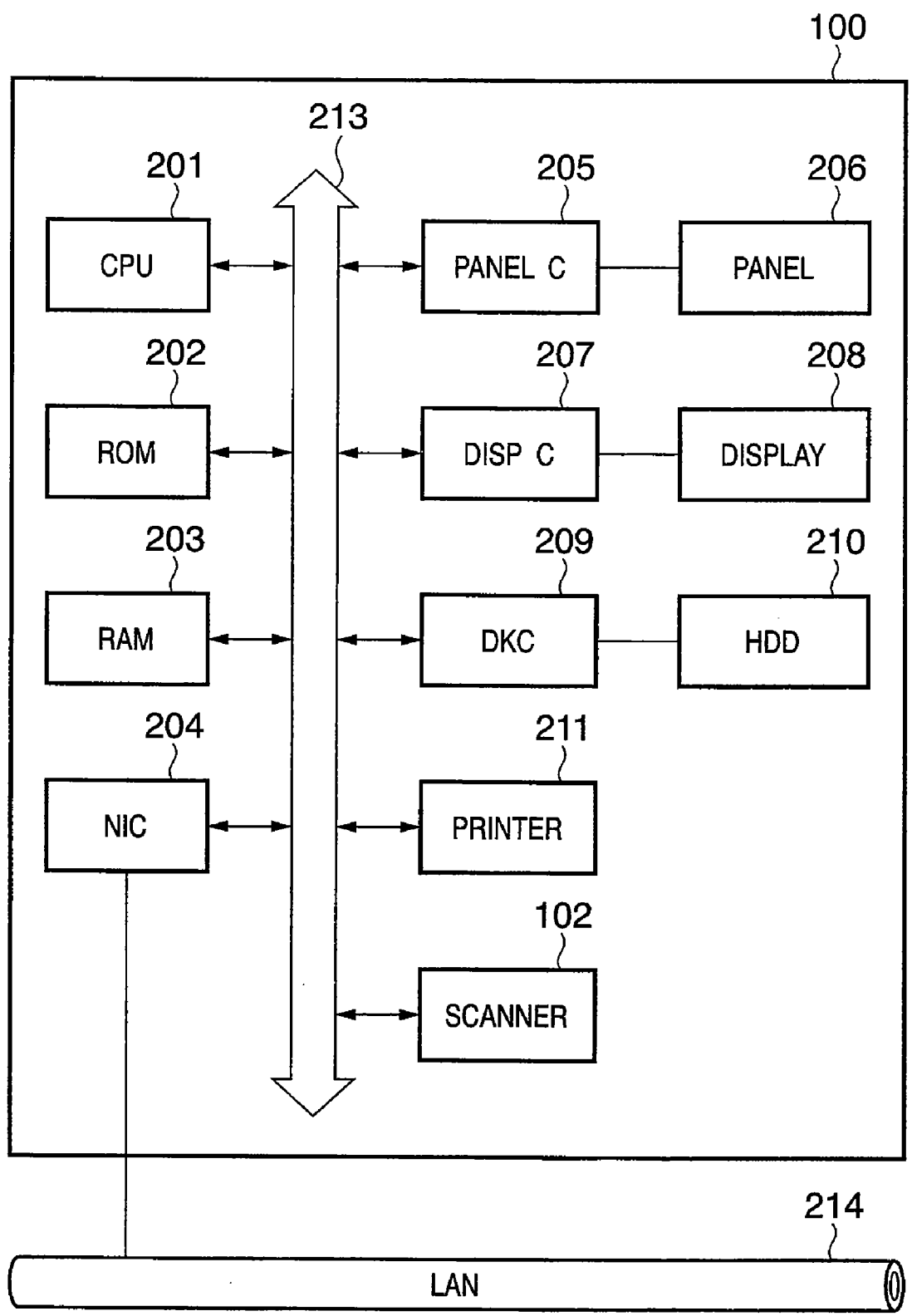
FIG. 2 is a block diagram showing an example of the internal arrangement of a multi-function peripheral (MFP) according to the embodiment.

FIG. 2 shows an example of the internal arrangement of the MFP according to the embodiment. The MFP 100 comprises a CPU 201 which executes software stored in a ROM 202 or a large-scale storage device 210 such as a hard disk or the like. The CPU 201 systematically controls respective devices connected to a system bus 213. A RAM 203 is a storage device which serves as a main memory, work area, or the like of the CPU 201.

A network interface card (NIC) 204 exchanges data with another network device, file server, and the like via a LAN 214. Note that the MFP 100 may comprise a communication unit with a facsimile communication function. Also, the MFP 100 may comprise a connection unit (e.g., a USB host unit, memory card reader, or the like) used to connect to the aforementioned external storage medium 104.

An external input controller (PANELC) 205 controls a control panel (various buttons or a touch panel) 206 equipped on the MFP. A display controller (DISPC) 207 controls the display on a display module (DISPLAY) 208. The display module 208 comprises, for example, a liquid crystal display or the like. A storage control unit 209 controls data read and write accesses to the large-capacity storage device 210. The large-capacity storage device 210 may comprise a nonvolatile storage medium other than the hard disk drive.

A printing unit 211 is implemented, for example, by an electrophotographic system, ink-jet system, or the like, and executes print processing on a sheet. The scanner 102 is a unit that scans an image printed on the sheet, as described above. Normally, the scanner 102 mounts an automatic document feeder (ADF), and can automatically scan a plurality of documents.

Figure 3:
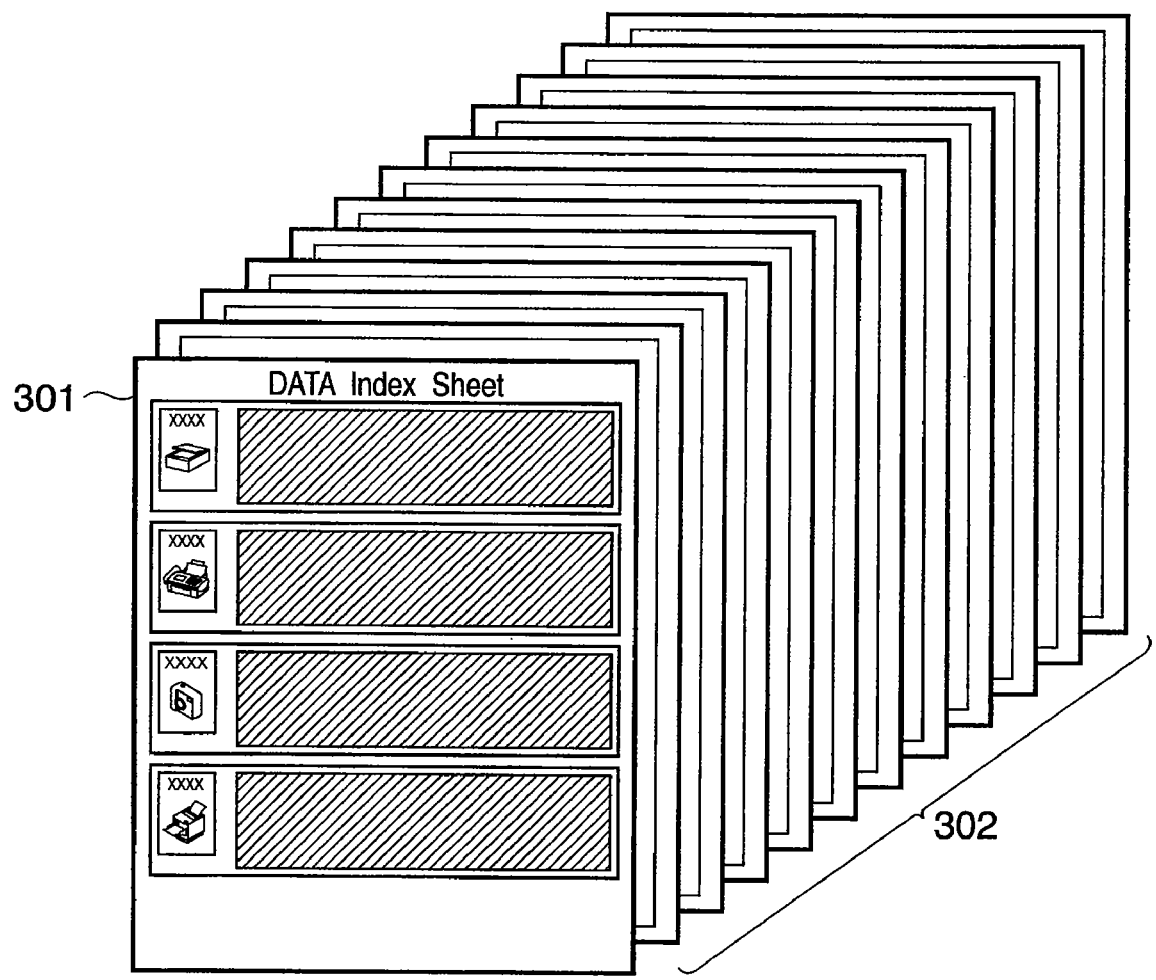
FIG. 3 shows a print example of 2D codes according to the embodiment.

FIG. 3 shows a print example of the 2D codes according to the embodiment. As described above, in this embodiment, the MFP 100 generates an index sheet 301 which allows the user to recognize 2D codes of files (data) printed on data sheets 302. As shown in FIG. 3, a list of files is printed on the index sheet 301 using 2D codes.

Note that the index sheet may be printed as the first page or a page other than the first page. In general, when the index sheet 301 is generated as the first page, it becomes easy to manage data sheets. This is because not only the user can see the first page most easily, but also because the scanner 102 scans it first.

Figure 4:
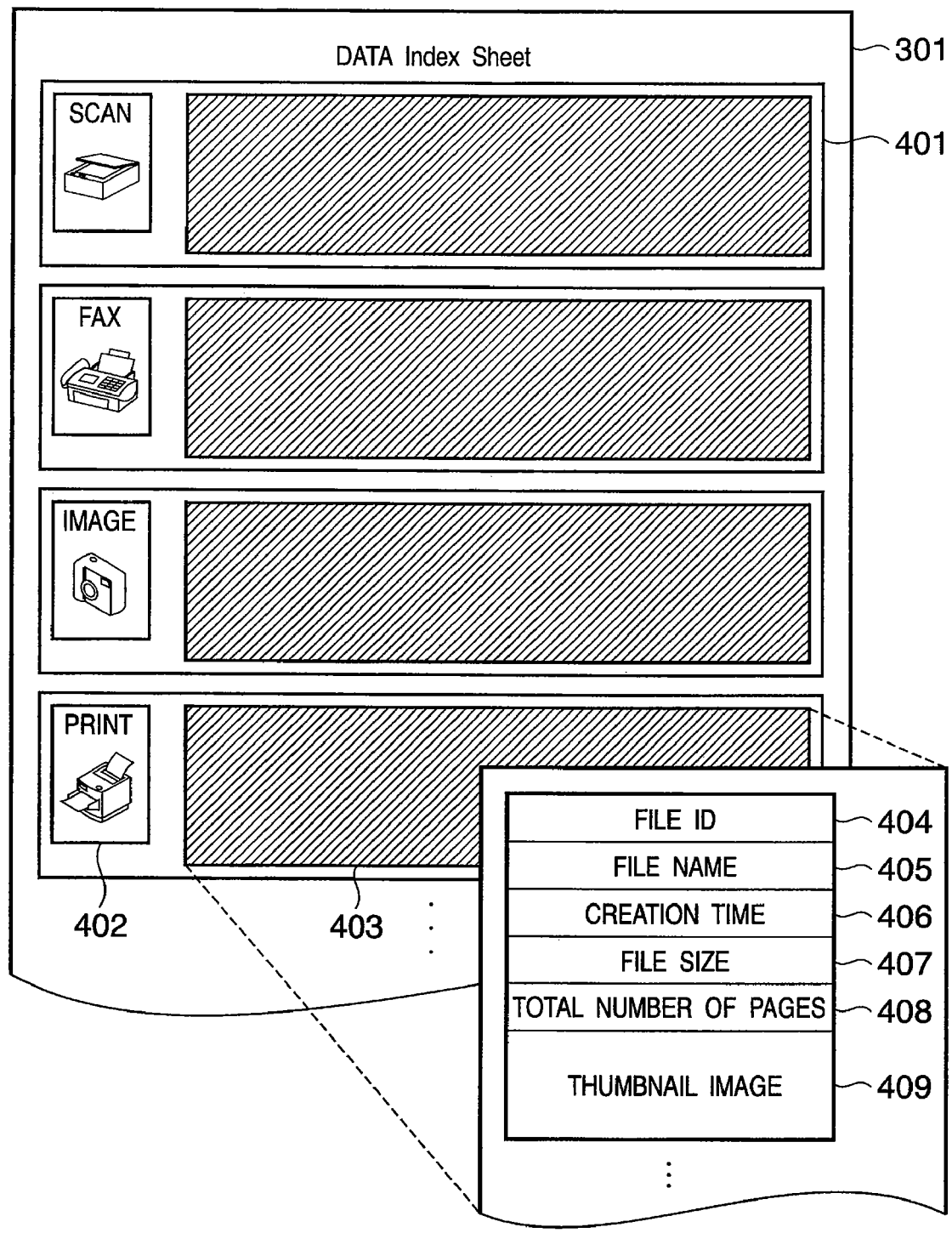
FIG. 4 shows an example of an index sheet according to the embodiment.

FIG. 4 shows an example of the index sheet according to the embodiment. Index information 401 is generated for each data (file). The index information 401 includes an icon 402 as a symbolic representation image (e.g., a thumbnail image or icon) that represents a data type, and a 2D code 403 of the identification information.

If the original data is an image or movie file, a thumbnail image may be adopted as the icon 402. By printing such symbolic representation images, it is easy for the user to recognize what types of data are encoded as 2D codes on the data sheets. Note that the symbolic representation images may be omitted. When the symbolic representation images are omitted, it becomes easy to keep secret what types of data are encoded as 2D codes. That is, omission of symbolic representation images helps to improve security.

The 2D code 403 of the identification information includes, for example, 2D codes of a file ID 404, file name 405, file creation time 406, file size 407, the total number of pages 408, and thumbnail image 409. The file ID 404 is unique information required to specify a file. The CPU 201 generates the file ID 404 of each file based on the body number of the MFP 100, time information, and the like. The file name 405 is the same as that from the input data. If the file name of the input data is not set in advance, the CPU 201 generates a file name. The file creation time 406 is information indicating the time when the file of the data was created. The file size 407 is information indicating the size (unit: bytes or the like) of a file.

The total number of pages 408 indicates how many data sheets were used to print the 2D codes. As described above, when the file to be processed is large in size, its 2D code cannot be printed on only one sheet. For this reason, information regarding the total number of pages 408 is helpful in knowing how many sheets were used to print the 2D code associated with a desired file. The thumbnail image 409 is a reduced-scale image of the file to be processed. Note that the image data of the aforementioned icon 402 may be adopted in place of the thumbnail image 409. Of course, the thumbnail image 409 is not indispensable for the present invention.

Figure 5:
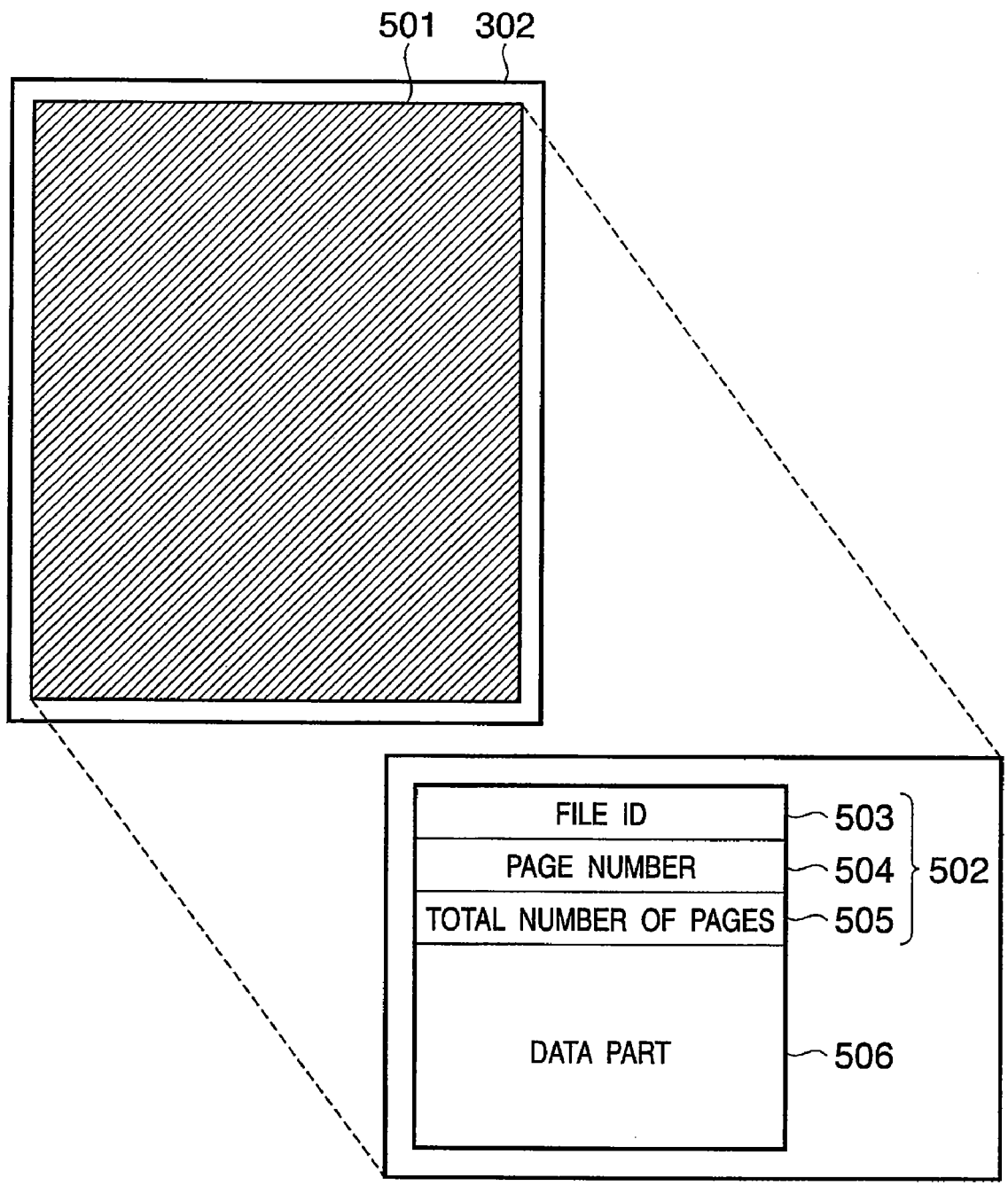
FIG. 5 shows an example of a data sheet according to the embodiment.

FIG. 5 shows an example of the data sheet according to the embodiment. A 2D code 501 of this data sheet 302 includes a header part 502 and data part 506. The header part 502 stores information indicating the number of the data sheet for that file, and the like. For example, the header part 502 may include a file ID 503, page number 504, and the total number of pages 505.

Note that the file ID 503 is the same information as the file ID 404 printed on the index sheet 301. The page number 504 is information indicating the page number of the data sheet in a data sheet set. The minimum value of the page number 504 is 1, and the maximum value is the total number of pages. The total number of pages 505 indicates how many data sheets were used to print the 2D code of a given file, and assumes the same value as the total number of pages 408 printed on the index sheet 301.

Note that the header part 502 may or may not be encoded as a 2D code. If the header part 502 is encoded as a 2D code, the secrecy of the data part 506 can be enhanced. On the other hand, if the header part 502 is not encoded as a 2D code, the user can visually confirm the information in the header part 502. For example, by noting the file ID, the user can easily find the data sheets of a desired file from a plurality of data sheets. By noting the page number 504, the user can re-arrange the data sheets in the correct order. By noting the total number of pages 505, the user can easily determine whether or not a desired file has all the data sheets.

Figure 6:
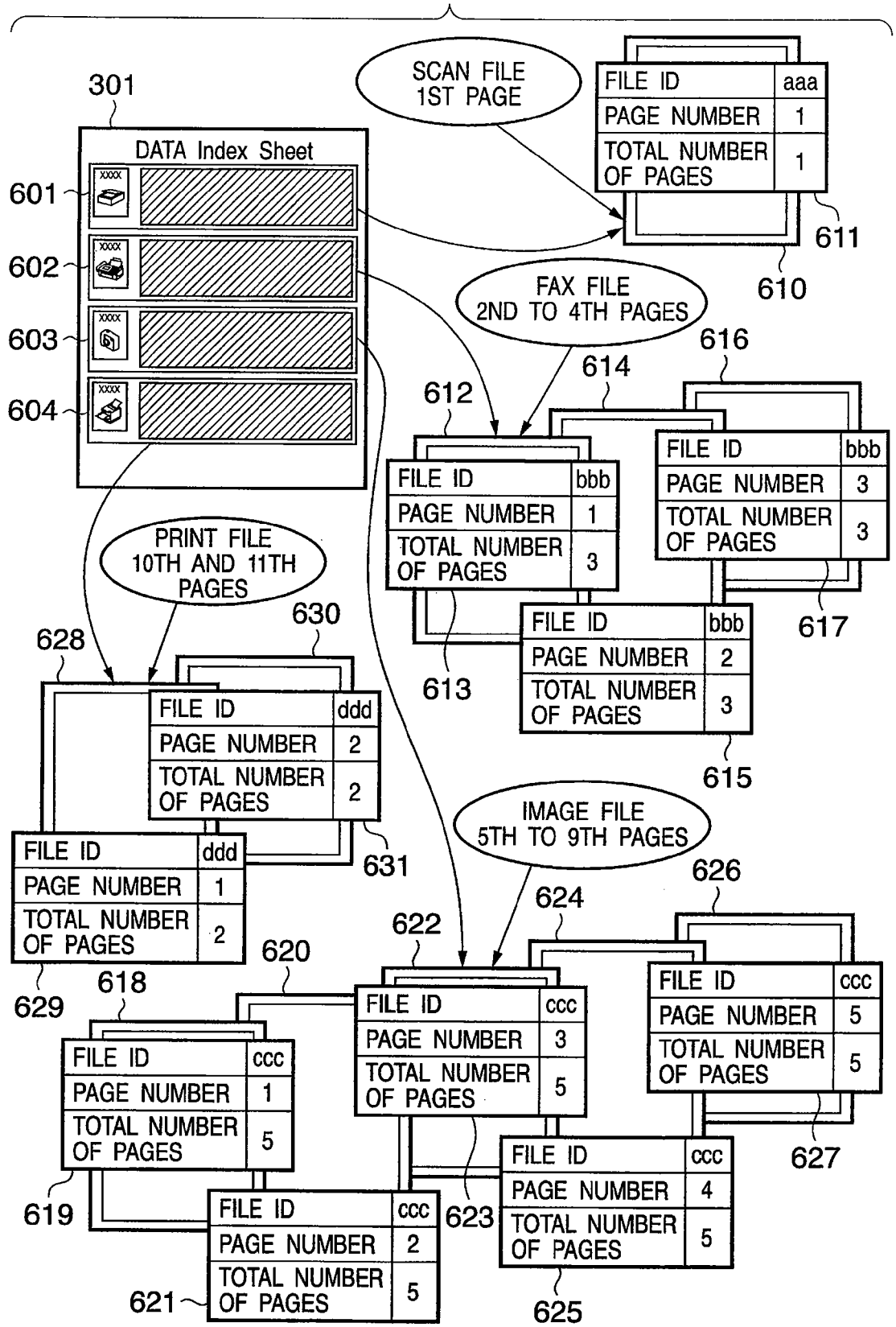
FIG. 6 shows the relationship between the index sheet and data sheets according to the embodiment.

FIG. 6 shows the relationship between the index sheet and data sheets according to the embodiment. In FIG. 6, for example, assume that a scan file, FAX file, image file, and print file are encoded as 2D codes. The scan file is an image file generated by the scanner 102. The FAX file is an image file received by the FAX function. The print file is an image file such as a bitmap image or the like which is rendered for printing. Note that the total number of data sheet pages for the scan file is 1. The total number of data sheet pages for the FAX file is 3. The total number of data sheet pages for the image file is 5. The total number of data sheet pages for the print file is 2.

Reference numeral 601 denotes index information for the scan file. Reference numeral 602 denotes index information for the FAX file. Reference numeral 603 denotes index information for the image file. Reference numeral 604 denotes index information for the print file. As can be understood from FIG. 6, each piece of index information includes an icon that represents the contents of the corresponding file.

The CPU 201 decodes the 2D code of the index information 601 to recognize that the file ID of the scan file is "aaa" and the total number of data sheet pages is "1". A data sheet 610 of the scan file includes a header part 611. In the header part 611, "aaa" is printed as the file ID, "1" is printed as the page number, and "1" is printed as the total number of pages.

The CPU 201 decodes the 2D code of the index information 602 to recognize that the file ID of the FAX file is "bbb" and the total number of data sheet pages is "3". Data sheets 612, 614, and 616 of the FAX file respectively include header parts 613, 615, and 616. In the respective header parts, "bbb" is printed as the file ID, and "3" is printed as the total number of pages. "1" is printed as the page number in header part 613. "2" is printed as the page number in header part 615. "3" is printed as the page number in header part 617. In this manner, the user and CPU 201 can recognize the correct date sheet order based on the page numbers.

The CPU 201 decodes the 2D code of the index information 603 in order to recognize that the file ID of the image file is "ccc" and the total number of data sheet pages is "5". Data sheets 618, 620, 622, 624, and 626 of the image file respectively include header parts 619, 621, 623, 625, and 627. In the respective header parts, "ccc" is printed as the file ID, and "5" is printed as the total number of pages. As the page numbers in the header parts, numerals "1" through "5" are printed in data sheet order.

The CPU 201 decodes the 2D code of the index information 604 in order to recognize that the file ID of the print file is "ddd" and the total number of data sheet pages is "2". Data sheets 628 and 630 of the print file respectively include header parts 629 and 631. In the respective header parts, "ddd" is printed as the file ID, and "2" is printed as the total number of pages. As the page numbers in the header parts, numerals "1" and "2" are printed in data sheet order.

Figure 7:
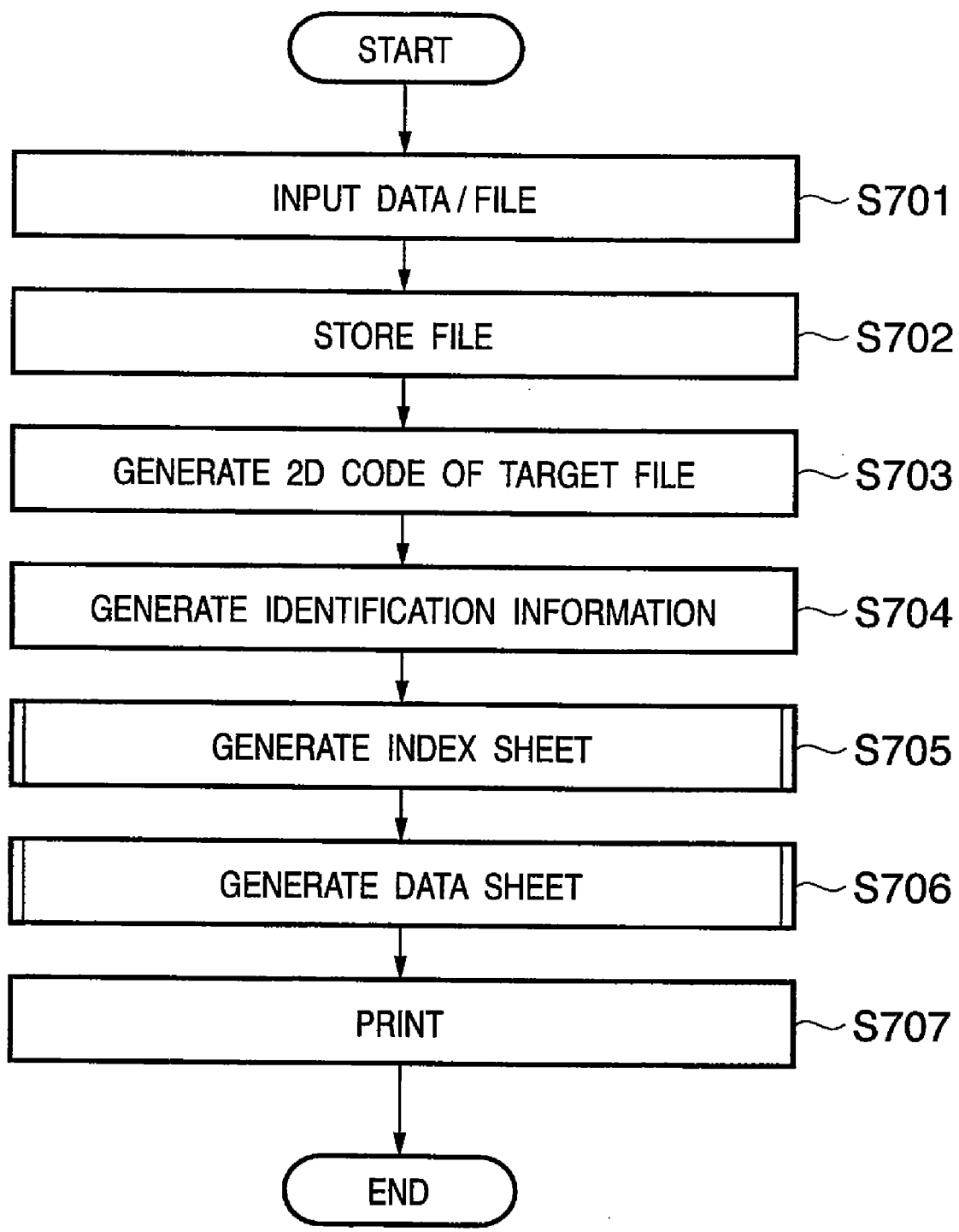
FIG. 7 is a flowchart showing an example of a 2D code print method according to the embodiment.

FIG. 7 is a flowchart showing an example of the 2D code print method according to the embodiment. In step S701, the CPU 201 executes input processing of data and files to be processed. For example, the CPU 201 acquires image data by driving the scanner 102 to scan a document. Also, the CPU 201 receives FAX data received from the external FAX apparatus 103. The CPU 201 reads out an image file or the like stored in the external storage medium 104. The CPU 201 receives a file transmitted from the network device 105 by controlling the NIC 204. In this manner, the scanner 102, FAX communication unit, memory card reader, NIC 204, or their control programs serve as a data input unit.

In step S702, the CPU 201 stores the input data as files in the large-capacity storage device 210 or the like. In step S703, the CPU 201 reads out a file to be encoded to generate a 2D code of that file.

In step S704, the CPU 201 generates identification information. The identification information includes the file ID 404, file name 405, file creation time 406, file size 407, the total number of pages 408, and thumbnail (icon) image 409, as described above. For example, the CPU 201 generates the file ID 404 based on the device serial number, current time, and the like. As for the file name, file creation time, and file size, the CPU 201 acquires and directly uses the information assigned to the file. The CPU 201 determines the total number of pages by counting the number of data sheets to be generated upon printing the generated 2D code.

The CPU 201 generates the thumbnail image based on the target file. Upon adapting the icon image, the CPU 201 selects it based on the extension (e.g., BMP, JPG, MP3, or the like) of the target file. Assume that the large-capacity storage device 210 pre-stores icon images corresponding to such extensions. Note that the CPU 201 may encode a symbolic representation image such as a thumbnail image, icon image, or the like to generate a 2D code. Especially, since the thumbnail image is merely a reduced-scale image of an original image file, the contents of the original image file are more likely to be exposed inadvertently. Hence, by generating the 2D code of the symbolic representation image, the secrecy of the original image file can be improved.

In step S705, the CPU 201 generates an index sheet based on the identification information generated for each file. In step S706, the CPU 201 generates data sheets using the generated identification information and the 2D code of the target file. In step S707, the CPU 201 prints the generated index sheet and data sheets using the printing unit 211.

Figure 8:
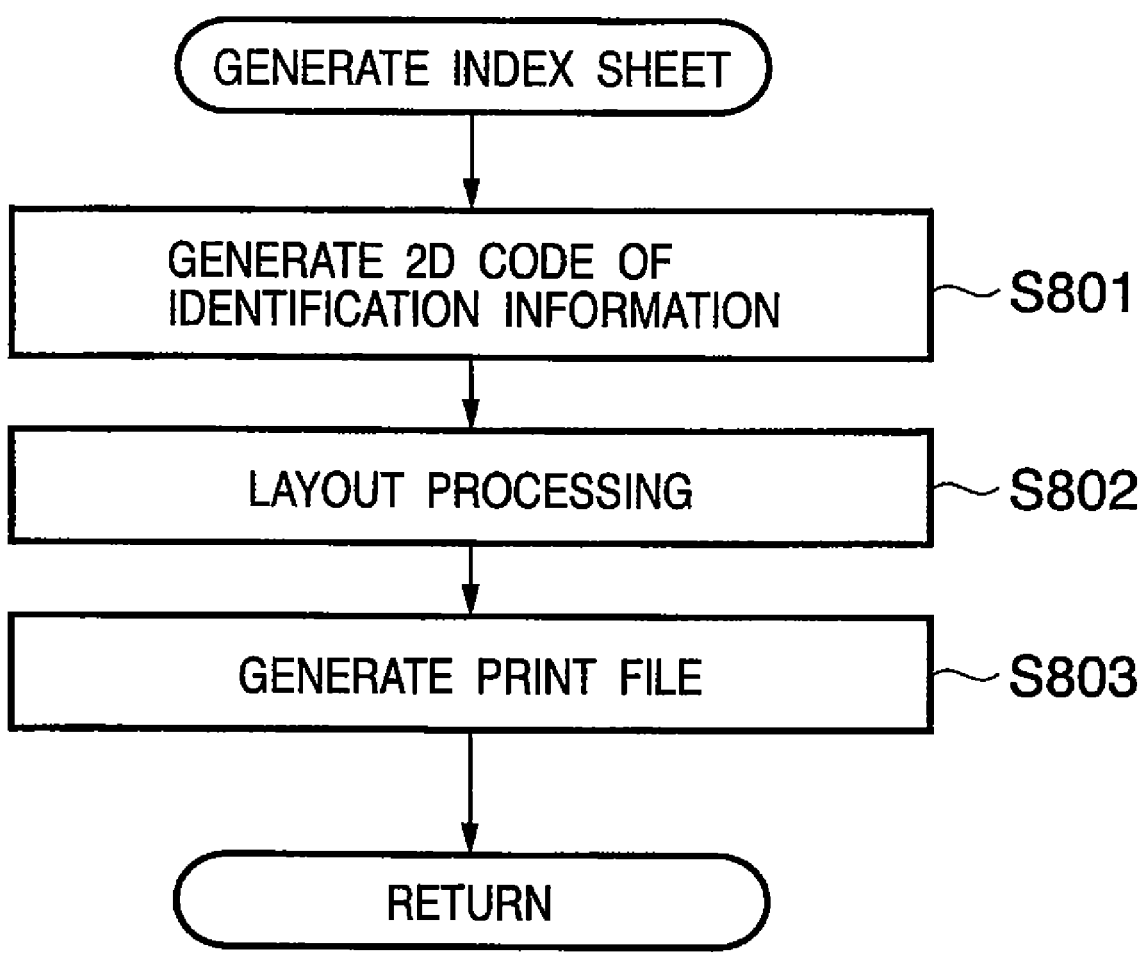
FIG. 8 is a flowchart showing an example of index sheet generation processing according to the embodiment.

FIG. 8 is a flowchart showing an example of index sheet generation processing according to the embodiment. This flowchart describes the aforementioned processing in step S705 as a subroutine.

In step S801, the CPU 201 generates 2D codes of identification information associated with respective files. Note that the CPU 201 may skip the 2D code generation step for the identification information. In step S802, the CPU 201 executes layout processing for the 2D codes 403 of the identification information and the icons 402 of the thumbnail images for respective files. For example, the CPU 201 executes the layout processing required to print the index sheet shown in, for example, FIG. 4. In step S803, the CPU 201 generates a print file to print the index sheet.

Figure 9:
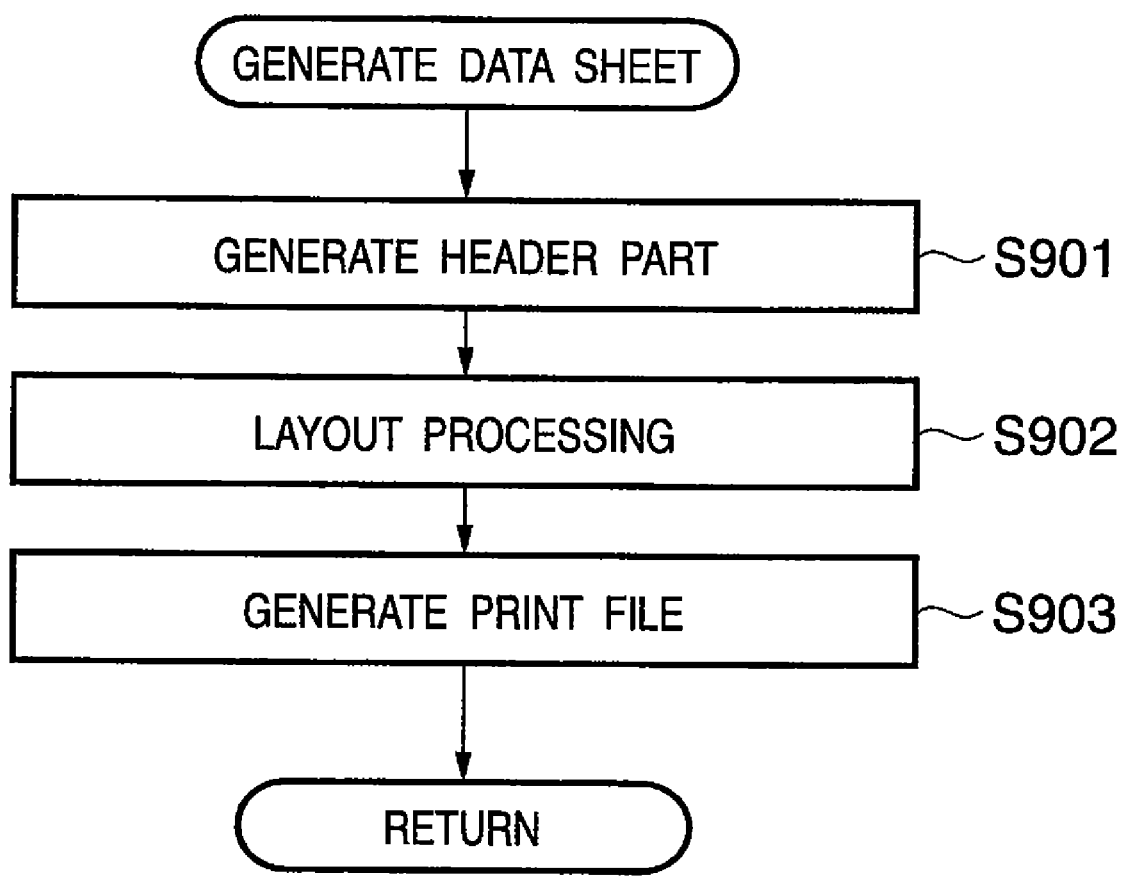
FIG. 9 is a flowchart showing an example of data sheet generation processing according to the embodiment.

FIG. 9 is a flowchart showing an example of data sheet generation processing according to the embodiment. This flowchart describes the aforementioned processing in step S705 as a subroutine.

In step S901, the CPU 201 generates header parts 502 based on the identification information associated with respective files. As described above, the CPU 201 may generate a 2D code of each header part 502. In step S902, the CPU 201 executes layout processing for the header parts 502 of the respective file and the data parts 506 as the 2D codes of the target files. For example, the CPU 201 executes layout processing to print the data sheet shown in, for example, FIG. 5. In step S903, the CPU 201 generates a print file to print the data sheets.

In the print processing (S707), the CPU 201 may execute processing for clearly specifying a separation between the 2D code of the preceding file and that of the succeeding file. According to the example shown in FIG. 6, the scan file corresponds to the preceding file, and the FAX file corresponds to the succeeding file. The processing for clearly specifying the separation includes, for example, page feed processing, blank page inserting processing, print processing of a marker indicating the separation, and the like. In this way, by clearly specifying the separation, it becomes easier for the user and CPU 201 to recognize the end of the data sheet(s) of each file.

Upon printing the 2D codes of a plurality of files, the CPU 201 may re-arrange the data sheets in a random order. For example, the first page (618) of the data sheets of the image file may be printed after the data sheet 610 of the scan file, and the third page (616) of the data sheets of the FAX file may be printed after the data sheet 618. In this manner, by re-arranging the data sheets in a print order different from the regular order, it is difficult for a third party to restore the files.

[Restoration Processing]

Figure 10:
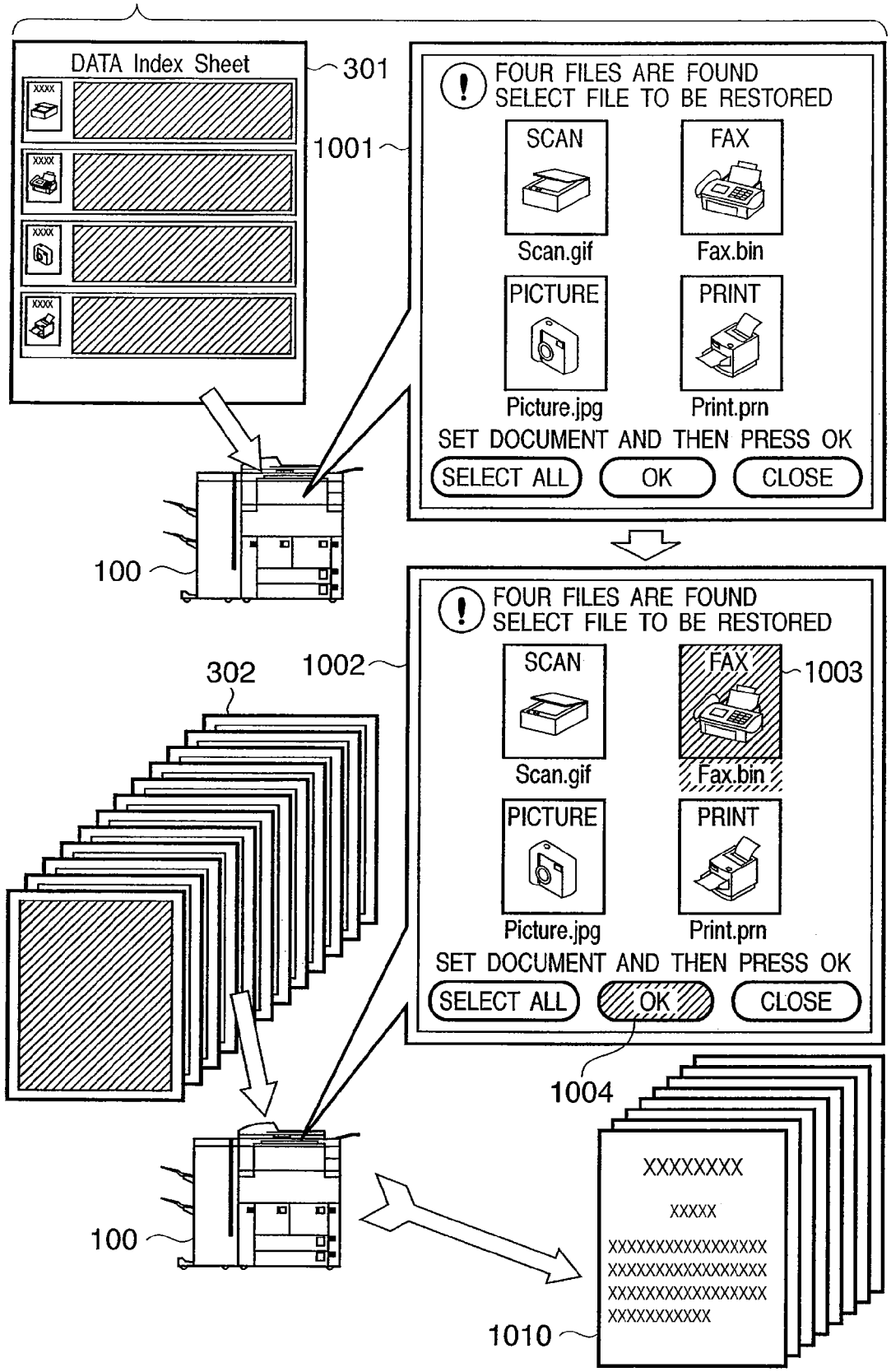
FIG. 10 is a view showing an overview of 2D code restoration processing according to the embodiment.

FIG. 10 shows an overview of the file restoration processing according to the embodiment. The MFP 100 scans the index and data sheets to extract a desired file.

The MFP 100 scans the index sheet 301 using the scanner 102. On the index sheet, the identification information required to identify the sheet on which the 2D code corresponding to each file is printed. The MFP 100 decodes the 2D codes of a plurality of pieces of identification information and displays a list of files embedded in the data sheets. A selection dialog 1001 displays respective symbolic representation images decoded from the 2D codes of the plurality of pieces of identification information to be selected from. The selection dialog 1001 may also display information such as file IDs, file names, total numbers of pages, and the like.

Since the user selects a symbolic representation image 1003 of a FAX file, a selection dialog 1002 displays the FAX file to be restored in a designated state. If the user presses an OK button 1004, the MFP 100 scans the data sheets 302 to execute restoration processing, print processing, and the like of the selected file. In this way, the MFP 100 prints the FAX file to obtain documents 1010.

Figure 11:
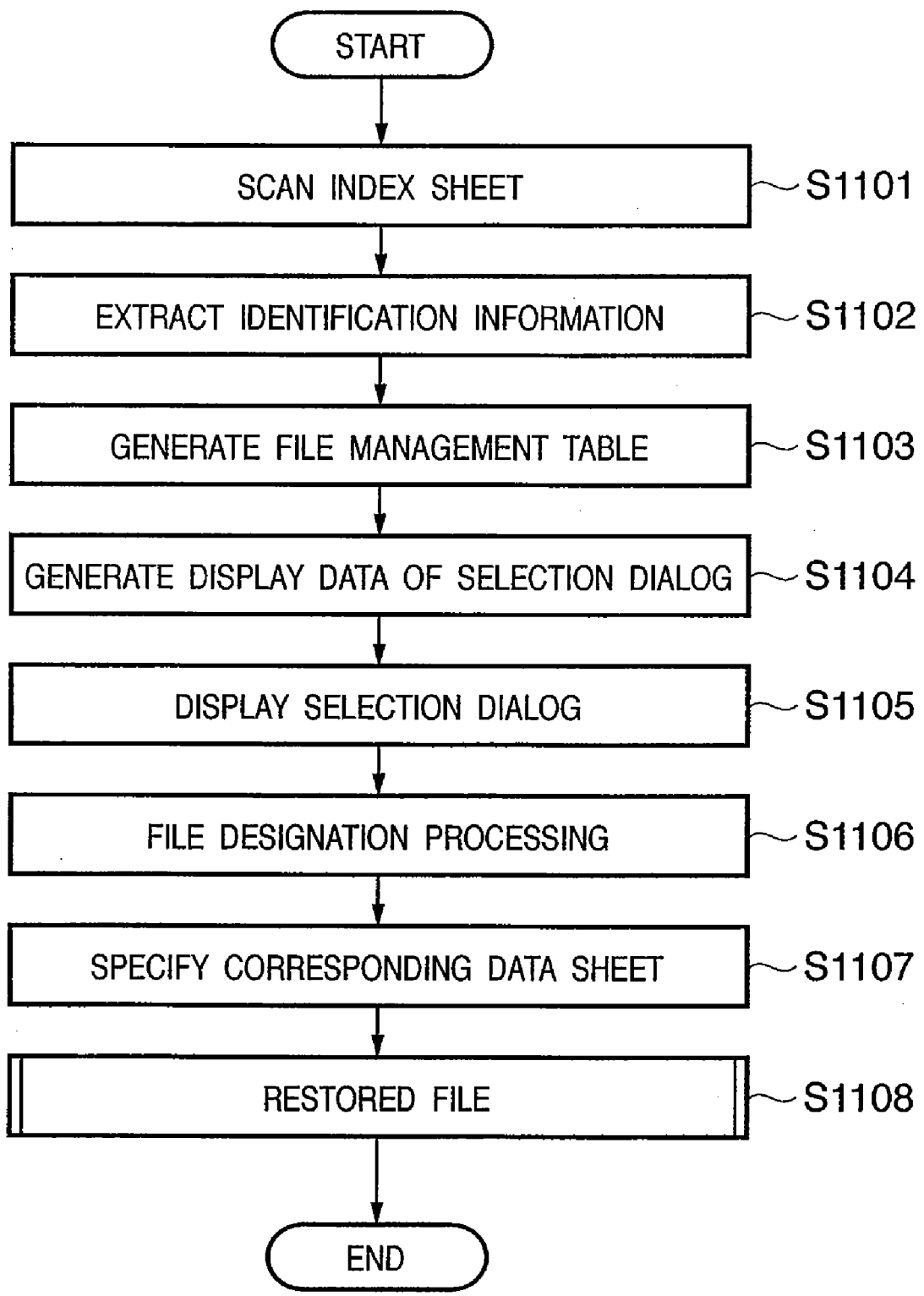
FIG. 11 is a flowchart showing an example of a file restoration method according to the embodiment.

FIG. 11 is a flowchart showing an example of the file restoration method according to the embodiment. In step S1101, the CPU 201 executes the scan processing of the index sheet 301 by driving the scanner 102. In step S1102, the CPU 201 extracts identification information included in the index sheet 301. When the identification information is printed as text, the CPU 201 extracts each identification information by character recognition processing. On the other hand, when the identification information is printed as a 2D code, the CPU 201 executes decoding processing of the 2D code. In step S1103, the CPU 201 generates a file management table based on the extracted identification information.

Figure 12:
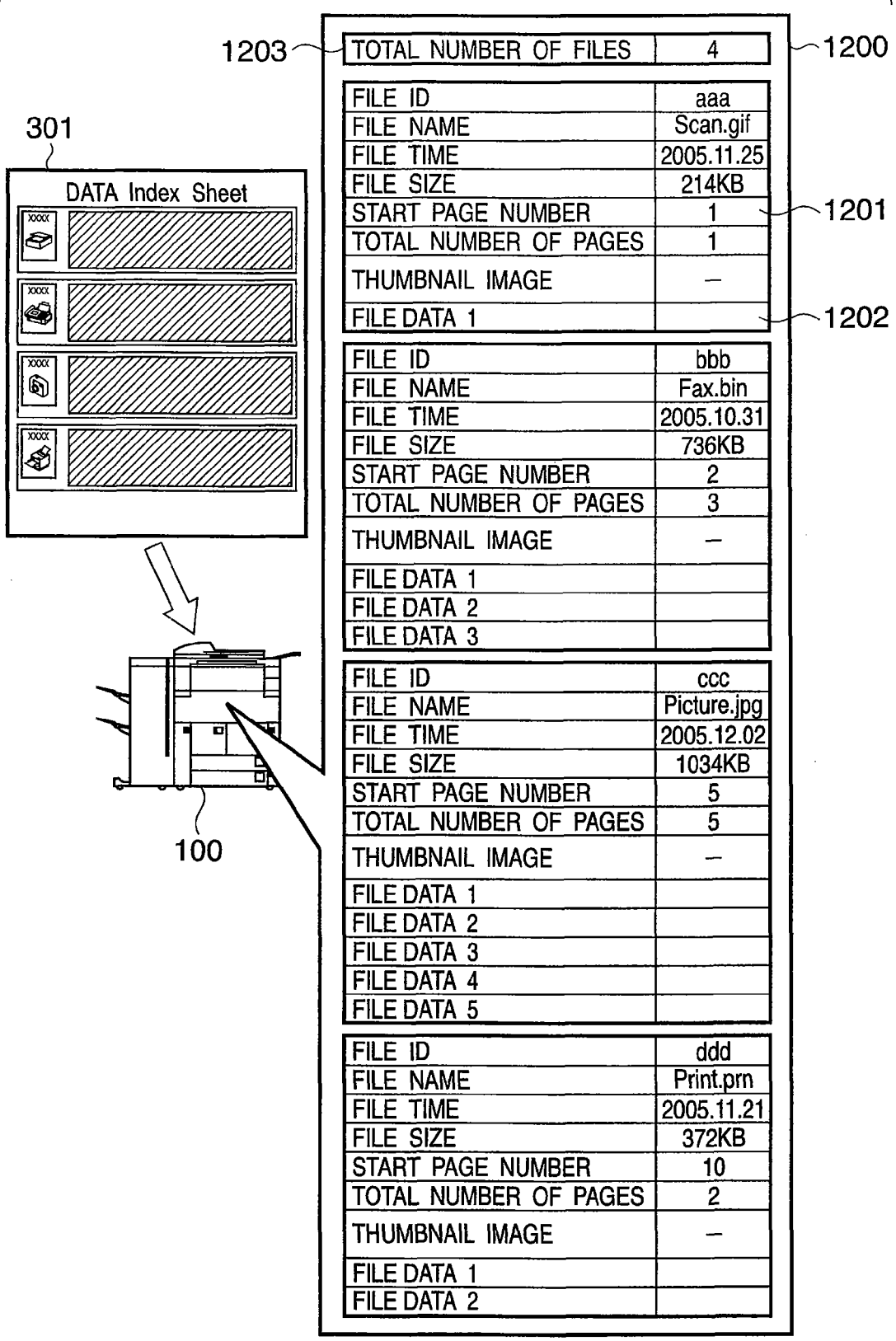
FIG. 12 shows an example of a file management table according to the embodiment.

FIG. 12 shows an example of the file management table according to the embodiment. A file management table 1200 stores the contents of the identification information extracted from the index sheet 301. For example, the file management table 1200 registers of a start page number 1201, a management part of file data 1202, and the total number of files 1203. Note that the file data is a 2D code scanned from the data sheet. When the 2D code is divisionally printed on a plurality of data sheets, file data as many as the number of data sheets are generated. Note that a plurality of file data may be merged into single file data, and that file data may be stored in the management part of file data 1202.

Note that the start page number indicates the page number, from which the data sheet of each file starts. The start page number is effective when the data sheets of respective files are arranged in a correct order. The management part of file data 1202 stores information indicating the storage location of file data. Note that the management part of file data 1202 may store the file data itself. The total number of files indicates that of files, the corresponding pieces of identification information of which are registered on the index sheet 301. In the example of FIG. 12, since four pieces identification information for four files are printed on the index sheet 301, the total number of files is "4".

Also, respective pieces of information are registered in the file management table 1200 shown in FIG. 12 based on the index sheet 301 shown in FIG. 6.

In step S1104, the CPU 201 generates display data of the selection dialog 1001 which allows the user to designate or select a file to be decoded. For example, the CPU 201 generates the display data of the selection dialog 1001 by appropriately laying out thumbnail images and file names read out from the file management table 1200. In step S1105, the CPU 201 displays the selection dialog 1001 on the display module 208.

In step S1106, the CPU 201 designates a file to be restored based on the information input via the control panel 206. For example, the CPU 201 detects a manipulation on a specific symbolic representation image 1003 displayed on the selection dialog 1001 to designate a file corresponding to the manipulated symbolic representation image. More specifically, the CPU 201 extracts the corresponding file ID and the like by referring to the file management table based on the symbolic representation image.

In step S1107, the CPU 201 specifies data sheets corresponding to the designated file. For example, the CPU 201 extracts information such as file ID, the total number of data sheet pages, and the like with reference to the file management table. Especially, file ID specifies the data sheets.

In step S1108, the CPU 201 restores the designated file by decoding the 2D codes printed on the specified data sheets. More specifically, the CPU 201 acquires the 2D codes by scanning all the corresponding data sheets using the scanner 102, and sequentially decodes the acquired 2D codes in accordance with the order of pages, thus restoring an original file.

Figure 13:
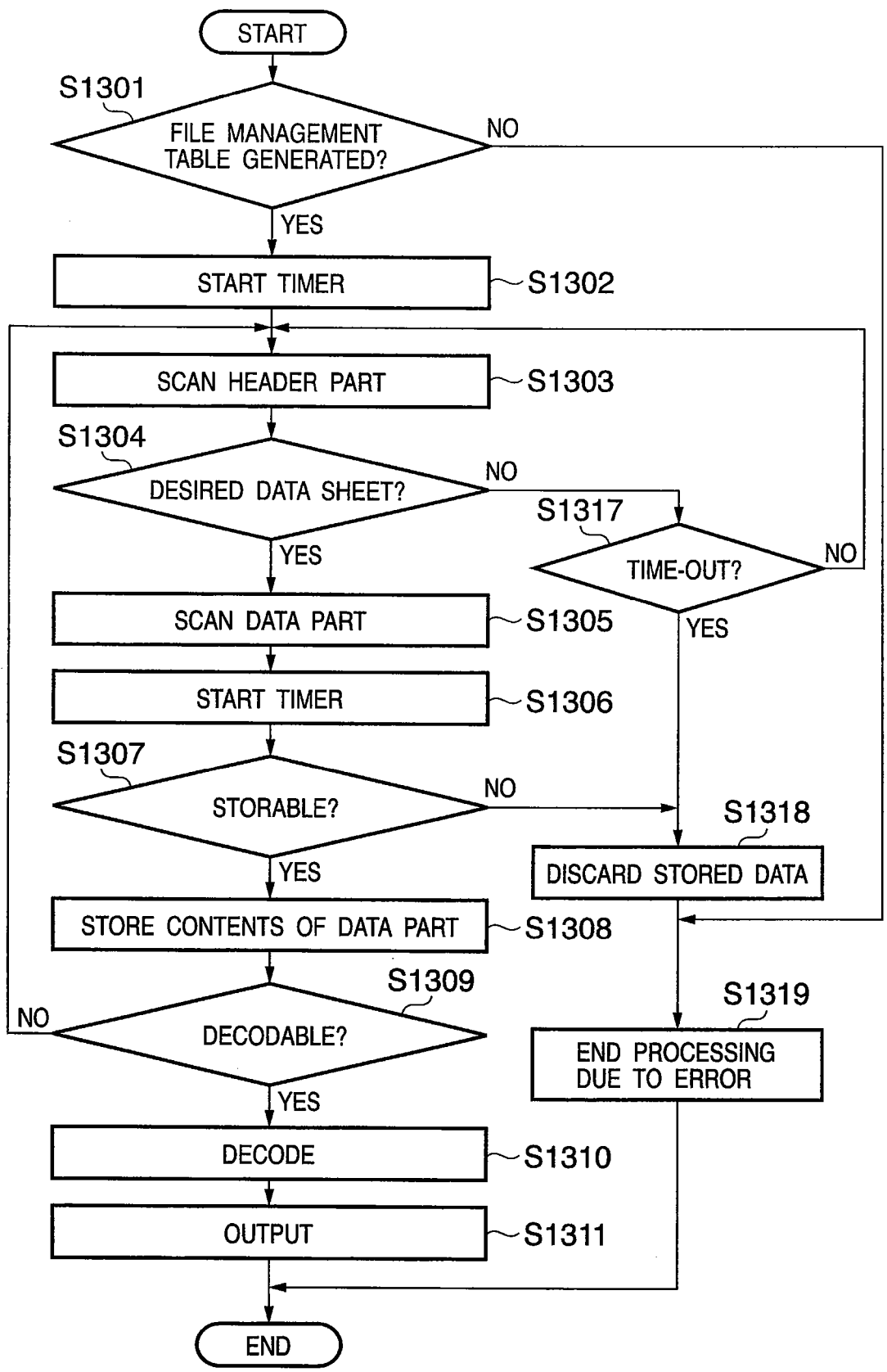
FIG. 13 is a flowchart showing an example of a restoration method of a 2D code printed on a data sheet according to the embodiment.

FIG. 13 is a flowchart showing an example of the decoding method of the 2D codes printed on the data sheets according to the embodiment. This flowchart describes step S1108 as a subroutine.

The CPU 201 checks in step S1301 if the file management table has been created. For example, the CPU 201 searches the large-capacity storage device 210 and the like for the file management table. If the search has succeeded, the process advances to step S1302. On the other hand, if the search has failed, the process jumps to step S1319, and the CPU 201 executes end processing due to an error. For example, the CPU 201 displays an error message on the display module 208.

In step S1302, the CPU 201 starts a monitor timer used to monitor a time period until all data sheets required to restore the designated file are obtained.

In step S1303, the CPU 201 scans the header part of each data sheet by driving the scanner 102. In this case, the CPU 201 need not scan the entire data sheet but it may scan only the header part 502. As a result of analysis of the contents of the header part 502, if the data sheet is not related to the designated file, the CPU 201 can skip scanning of the data part 506.

The CPU 201 checks based on the contents of the header part in step S1304 whether the data sheet of interest is a desired one or not. For example, the CPU 201 checks if the file ID described in the header part matches that of the desired file. If the data sheet of interest is the desired one, the process advances to step S1305.

If the data sheet of interest is not a desired one, the process advances to step S1317, and the CPU 201 checks if the monitor timer has reached a time-out. If the monitor time has not reached a time-out yet, the process advances to step S1303, and the CPU 201 scans the header part of the next data sheet using the scanner 102. On the other hand, if the monitor timer has reached a time-out, the CPU 201 discards information of the header part and the like scanned from the data sheet in step S1318, and the process advances to step S1319. For example, in the restoration processing of a file restored by 100 data sheets, if one data sheet is missing, the file can no longer be restored. Hence, this embodiment prevents data for 99 pages stored in the storage device from remaining in the storage device indefinitely by deleting these data, thus allowing effective use of storage resources.

In this manner, the CPU 201 determines a data sheet which is not required to restore the designated file based on the information of the header part, and can skip scanning of that unnecessary sheet. For this reason, the CPU 201 can skip the scanning processing and decoding processing for the unnecessary data sheet, thus speeding up the processing.

In step S1305, the CPU 201 scans the data part (2D code) of the data sheet. In step S1306, the CPU 201 restarts (resets) the monitor timer.

The CPU 201 checks in step S1307 if the contents (the aforementioned file data) of the scanned data parts can be stored in the file management table or the like. For example, the CPU 201 confirms if the management part (storage area) of file data 1202 corresponding to the total number of data sheet pages is assured on the file management table. If the contents of the scanned data parts cannot be stored, the process advances to step S1318, and the CPU 201 discards the scanned file data. On the other hand, if the contents of the scanned data parts can be stored, the process advances to step S1308, and the CPU 201 stores the file data in the management part.

Figure 14:
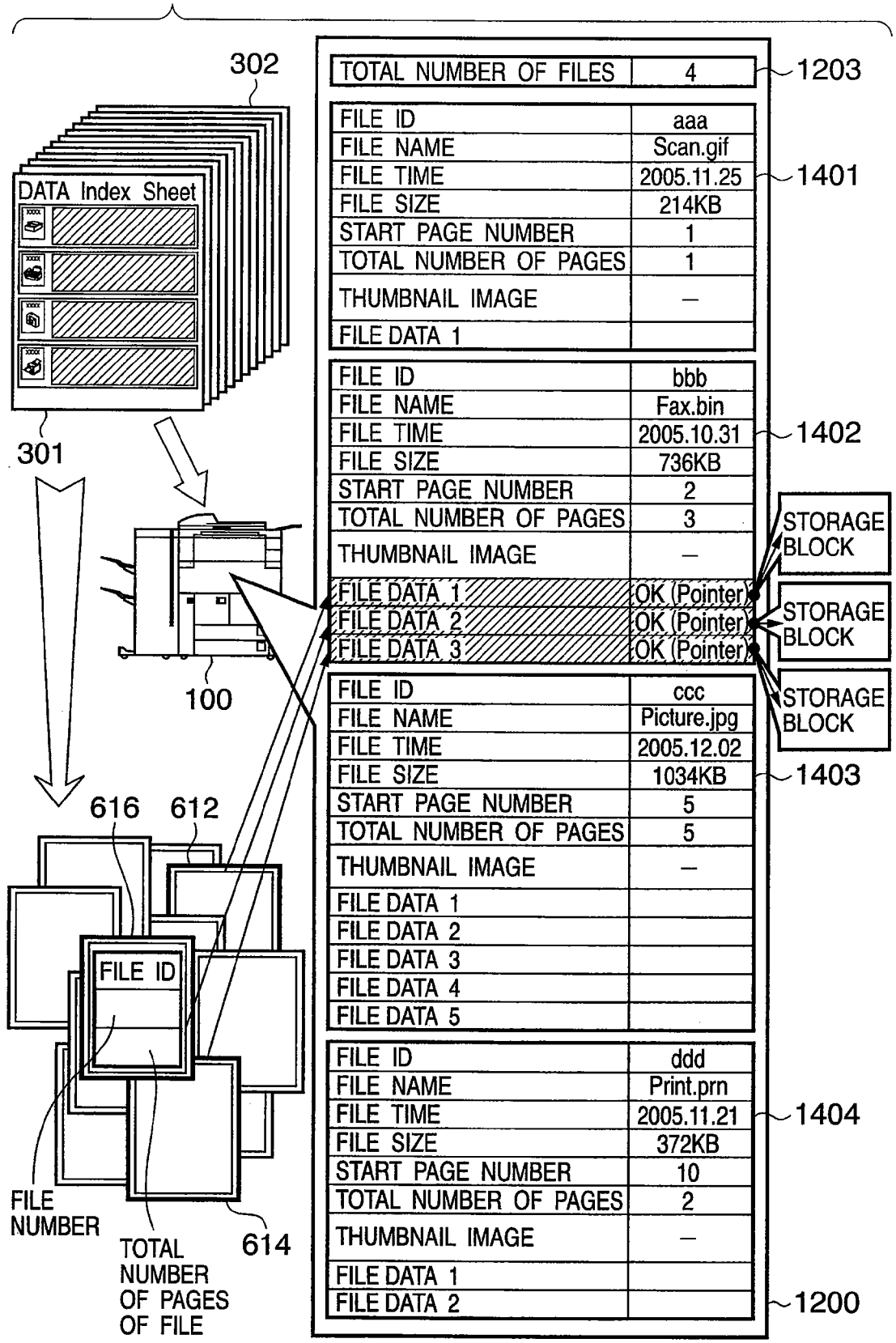
FIG. 14 is a view for explaining processing for acquiring fill data from a data sheet required to restoration a desired file, and storing the acquired fill data in the file management table according to the embodiment.

FIG. 14 is view for explaining the processing for acquiring file data from data sheets required to restore a desired file, and storing the acquired file data in the file management table. FIG. 14 shows the file management table 1200 shown in FIG. 6. Also, entries 1401 to 1404 are assured in correspondence with the four files.

A case will be examined below wherein the FAX file is to be restored. In this case, the data sheets 612, 614, and 616 must be scanned. Hence, the CPU 201 recognizes the data sheets of the FAX file based on file ID described in the header part. The CPU 201 stores the contents (file data) of the acquired data parts in the corresponding management parts in accordance with the page numbers in the header parts. Note that the file data may be stored in a storage block assured on the large-capacity storage device 210 in place of the file management table, as described above.

Since file ID and page number are assigned to the header part, the file can be accurately restored even when the order of data sheets is not correct.

The CPU 201 checks in step S1309 if the 2D code of an original file is decodable. For example, the CPU 201 checks based on the total number of pages registered in the file management table if the data parts can be acquired from all the data sheets required to decode the 2D code. If the data sheets to be scanned still remain, the process returns to step S1303 to scan the next data sheet.

If all the data parts are acquired, the process advances to step S1310, and the CPU 201 merges the necessary data to restore an original 2D code, and decodes this 2D code. In this way, the original file can be restored.

In step S1311, the CPU 201 outputs the restored file. For example, the CPU 201 executes print processing via the printing unit 211. The CPU 201 may transmit the restored file to a predetermined mail address. Alternatively, the CPU 201 may display the contents of the restored file on the display module 208.

As described above, the printing apparatus such as the MFP 100 or the like prints a 2D code of a file on data sheets, and prints on an index sheet identification information required to identify the sheet on which the 2D code corresponding to each file is printed. The restoration apparatus such as the MFP 100 or the like scans the index sheet to acquire identification information required to identify the data sheet on which the 2D file corresponding to a desired file is printed. The restoration apparatus specifies data sheets on which the 2D code corresponding to the designated file is printed based on the identification information. The restoration apparatus restores a desired file by decoding the 2D code on the specified data sheets. Hence, according to this embodiment, the operation required to restore a desired file can be simplified.

Note that the CPU 201 may recognize the separation between the 2D code of the preceding file and that of the succeeding file based on the page feed, blank page, or marker indicating the separation. In this way, since the CPU 201 can accurately determine the separation of the 2D codes, it can decode the file without any errors.

As described above, when the data sheets are printed in a random order, the 2D codes scanned from the data sheets can be re-arranged in a correct order based on the identification information such as the file ID, page numbers, and the like. Hence, this embodiment can restore a desired file while enhancing the secrecy of information.

[Other Embodiments]

The aforementioned embodiment adopts the 2D code as an example. However, the present invention is not limited to such specific code. For example, an n-dimensional code (n is a natural number equal to or larger than 3) may be adopted.

Various embodiments have been explained in detail. However, the present invention can be applied to either a system constituted by a plurality of devices, or an apparatus consisting of a single device. For example, the present invention may be applied to a scanner, printer, PC, copying machine, MFP, and facsimile apparatus.

The present invention can also be achieved by directly or remotely supplying a program of software that implements the functions of the aforementioned embodiments to a system or apparatus, and reading out and executing the supplied program code by a computer of that system or apparatus.

Therefore, the program code itself installed in a computer to implement the functions and processing of the present invention using the computer implements the present invention. That is, the present invention includes the computer program itself for implementing the functions and processing of the present invention.

In this case, the form of program is not particularly limited, and an object code, a program to be executed by an interpreter, script data to be supplied to an OS, and the like may be used as long as they have the program function.

As a recording medium for supplying the program, for example, a flexible disk, hard disk, optical disk, magneto-optical disk, MO, CD-ROM, CD-R, CD-RW, and the like may be used. Also, as the recording medium, a magnetic tape, nonvolatile memory card, ROM, DVD (DVD-ROM, DVD-R), and the like may be used.

The program may also be downloaded from a home page on the Internet using a browser running on a client computer. That is, the computer program itself of the present invention or a compressed file including an automatic installation function may be downloaded onto a recording medium such as a hard disk or the like. The program code which forms the program of the present invention may be segmented into a plurality of files, and the respective files may be downloaded from different home pages. That is, a WWW server which makes a plurality of users download the program file for implementing the functions and processing of the present invention using a computer may also become a building component of the present invention.

A storage medium such as a CD-ROM or the like, which stores the encrypted program of the present invention may be distributed to users. In this case, only a user who meets predetermined conditions is allowed to download key information used to decrypt the encrypted program from a home page via the Internet, to decrypt the encrypted program using that key information, and to install the program in the computer.

The functions of the aforementioned embodiments may be implemented by executing the readout program code by the computer. Note that an OS or the like running on the computer may execute some or all of actual processes on the basis of an instruction of that program. Of course, in such case as well, the functions of the aforementioned embodiments can be implemented.

Furthermore, the program read out from the recording medium may be written in a memory equipped in a function extension board or function extension unit, which is inserted in or connected to the computer. Based on an instruction of that program, a CPU or the like equipped in the function extension board or function extension unit may execute some or all of actual processes. In this way, the functions of the aforementioned embodiments may be implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-026180, filed Feb. 2, 2006, which is hereby incorporated by reference herein in its entirety.

What is claimed is:

1. A printing apparatus comprising:
   an input unit which inputs a file;
   a code information generating unit which generates a first code information based on the file, the first code information including identification information of the file, a page number of the file, a total page number of the file, and a data part;
   a printing unit which prints the first code information including the identification information of the file, the page number of the file, the total page number of the file, and the data part on a first sheet group, whereas the coded identification information, the page number and the total page number are printed in a header part of the sheets of the first sheet group and the coded data part is printed in a data part of the sheets of the first sheet group, and prints a second code information including identification information of the file inputted by the input unit on a second sheet group,
   a reading unit which reads the identification information printed on the first and second sheet groups;
   a determination unit which determines whether a desired sheet is found or not based on the identification information read by the reading unit;
   a processing unit is configured to;
      start a timer to monitor the processing time;
      if the determination unit determines that the desired sheet is not found, determine whether the timer has reached a preset time period,
      if the processing unit determines that the timer has not reached the preset time period, make the reading unit skip reading of the data part of an undesired sheet and make the reading unit read the header part of another sheet,
      if the processing unit determines that the timer has reached the preset time period, discard an accumulated data obtained by the reading unit,
   if the determination unit determines that the desired sheet is found, make the reading unit read the data part of the desired sheet;
   a storage unit which stores data read from the data part; and
   a decoding unit which decodes the data stored in the storage unit when the data stored in the storage unit becomes decodable.

2. The printing apparatus according to claim 1, wherein the second code information includes thumbnail image information of the file.

3. The printing apparatus according to claim 1, further comprising:
   a displaying unit which displays a selection screen on which a file to be restored is selected, based on the second information on the second sheet group,
   wherein the reading unit reads the first code information printed on the first sheet group, and
   the decoding unit decodes the file selected on the selection screen based on the first code information read by the reading unit.

4. A method of printing comprising the steps of:
   inputting a file;
   generating a first code information based on the file, the first code information including identification information of the file, a page number of the file, a total page number of the file, and a data part;
   printing the first code information including the identification information of the file, the page number of the file, the total page number of the file, and the data part on a first sheet group, whereas the coded identification information, the page number and the total page number are printed in a header part of the sheets of the first sheet group and the coded data part is printed in a data part of the sheets of the first sheet group, and printing a second code information including identification information of the inputted file on a second sheet group;
   starting a timer to monitor the processing time;
   reading the identification information printed on the first and second sheet groups;
   determining whether a desired sheet is found or not based on the identification information read at the reading step;
   determining, if it is determined that the desired sheet is not found, whether the timer has reached a preset time period,
      if it is determined that the timer has not reached the preset time period, skipping reading of the data part of an undesired sheet and reading the header part of another sheet at the reading step,
      if it is determined that the timer has reached the preset time period, discarding an accumulated data obtained at the reading step,
   reading, if it is determined that the desired sheet is found, the data part of the desired sheet;
   storing data read from the data part; and
   decoding the data stored at the storing step when the stored data becomes decodable.

5. The method according to claim 4, wherein the second code information includes thumbnail image information of the file.

6. The method according to claim 4, further comprising the steps of:

displaying a selection screen on which a file to be restored is selected, based on the second information on the second sheet group;

reading the first code information printed on the first sheet group; and decoding the file selected on the selection screen, based on the read first code information.

* * * * *